United States Patent
Scorsone et al.

(10) Patent No.: US 10,035,945 B2
(45) Date of Patent: Jul. 31, 2018

(54) METHODS OF DELAYING THE CURING OF MOISTURE SENSITIVE CURABLE ELASTOMERS

(75) Inventors: Jason T. Scorsone, Houston, TX (US); Arvind D. Patel, Sugar Land, TX (US); Mark W. Sanders, Aberdeen (GB)

(73) Assignee: M-I L.L.C., Houston, TX (US)

( * ) Notice: Subject to any disclaimer, the term of this patent is extended or adjusted under 35 U.S.C. 154(b) by 327 days.

(21) Appl. No.: 13/000,518

(22) PCT Filed: Jun. 17, 2009

(86) PCT No.: PCT/US2009/047609
§ 371 (c)(1),
(2), (4) Date: Dec. 21, 2010

(87) PCT Pub. No.: WO2010/008743
PCT Pub. Date: Jan. 21, 2010

(65) Prior Publication Data
US 2011/0100628 A1    May 5, 2011

Related U.S. Application Data

(60) Provisional application No. 61/075,234, filed on Jun. 24, 2008.

(51) Int. Cl.
*C09K 8/42*    (2006.01)
*C09K 8/575*    (2006.01)
*C09K 8/035*    (2006.01)
*C09K 8/508*    (2006.01)

(52) U.S. Cl.
CPC ............ *C09K 8/5755* (2013.01); *C09K 8/035* (2013.01); *C09K 8/5086* (2013.01)

(58) Field of Classification Search
CPC .......... E21B 43/26; E21B 33/13; E21B 47/12; E21B 47/122; E21B 29/005; E21B 33/12; E21B 34/14; E21B 43/08; E21B 43/16; E21B 43/25; E21B 44/00; E21B 47/00; E21B 47/06; E21B 49/08; E21B 2034/005; E21B 21/067; E21B 21/08; E21B 23/00; E21B 23/01; E21B 23/06; E21B 25/16; E21B 31/06; E21B 31/107; E21B 31/113; E21B 33/03; E21B 33/06; E21B 33/068; E21B 33/1204; E21B 33/126; E21B 33/134; E21B 43/267; E21B 43/40; E21B 44/02; E21B 45/00; E21B 47/0001; E21B 47/024; E21B 47/14; E21B 47/18; E21B 49/003; E21B 49/081; E21B 49/087; E21B 4/18; E21B 7/04; E21B 7/26; C09K 8/74; C09K 2208/04; C09K 2208/10; C09K 2208/12; C09K 8/08; C09K 8/18; C09K 8/36; C09K 8/42; C09K 8/524; C09K 8/58; C09K 8/68; C09K 8/685
See application file for complete search history.

(56) References Cited

U.S. PATENT DOCUMENTS

| | | | | |
|---|---|---|---|---|
| 4,114,382 | A * | 9/1978 | Kubens ................. | C09K 17/30 405/259.1 |
| 4,920,192 | A * | 4/1990 | Wiser-Halladay . | C08G 18/0852 166/281 |
| 7,845,409 | B2 * | 12/2010 | Shinbach ............. | E21B 43/267 166/280.2 |
| 2002/0115811 | A1 | 8/2002 | Huang et al. | |
| 2003/0186820 | A1 * | 10/2003 | Thesing ................ | C09K 8/685 507/200 |
| 2006/0122352 | A1 | 6/2006 | Burckhardt | |
| 2006/0124303 | A1 * | 6/2006 | Nguyen ................ | C09K 8/805 166/280.1 |
| 2006/0234871 | A1 | 10/2006 | Dalrymple et al. | |
| 2006/0293437 | A1 | 12/2006 | Ukai et al. | |
| 2007/0144736 | A1 * | 6/2007 | Shinbach ................ | C09K 8/80 166/250.1 |
| 2007/0187146 | A1 | 8/2007 | Wylie et al. | |
| 2008/0035337 | A1 * | 2/2008 | Reddy ..................... | C09K 8/68 166/276 |
| 2008/0071058 | A1 | 3/2008 | Rosthauser | |

FOREIGN PATENT DOCUMENTS

| | | | |
|---|---|---|---|
| GB | 2327425 | * | 1/1999 |
| GB | 2327425 A | * | 1/1999 |

OTHER PUBLICATIONS

Lyondell Material safety data sheet.*
Lyondell Material safety data sheet, dated Dec. 15, 2004.*
DMS-D33—Diacetoxymethyl Terminated Polydimethylsiloxane Gelest product datasheet downloaded on Aug. 24, 2016.*
International Search Report issued in PCT/US2009/047609, dated Jan. 14, 2010, 3 pages.
Written Opinion issued in PCT/US2009/047609, dated Jan. 14, 2010, 4 pages.
Witucki, "A Silane Primer: Chemistry and Applications of Alkoxy Silanes," A Journal of Coatings Technology Reprint, presented at the 57th Annual Meeting of the Federation of Societies for Coatings Technology, Oct. 21, 1992, 4 pages.
First Office Action, with English translation, issued in Chinese Application No. 200980131755.2, dated Dec. 19, 2012, 12 pages.
Extended European Search Report dated Oct. 1, 2012, received in corresponding European Application No. 09798425.6 (9 pages).
Official Action received in corresponding European Application No. 09798425.6, dated Dec. 9, 2013 (6 pages).

(Continued)

*Primary Examiner* — Kumar R Bhushan
(74) *Attorney, Agent, or Firm* — David J. Smith

(57) ABSTRACT

A method of treating a formation that includes injecting gelling components curable by a moisture cure into a selected region of the formation; and controlling the onset of curing of the gelling components by contacting the gelling components with a drying agent is disclosed.

17 Claims, 6 Drawing Sheets

(56) References Cited

OTHER PUBLICATIONS

Communication pursuant to Article 94(3) for the equivalent European patent application 09798425.6 dated Dec. 21, 2015.

* cited by examiner

METHODS OF DELAYING THE CURING OF MOISTURE SENSITIVE CURABLE ELASTOMERS

BACKGROUND OF INVENTION

Field of the Invention

Embodiments disclosed herein relate generally to polymer gel treatments in a wellbore and methods for delaying the onset of curing of such gel treatments downhole.

Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

A common problem encountered during drilling operations is "lost circulation," characterized by loss of drilling mud into downhole formations that are fractured, highly permeable, porous, cavernous, or vugular. The drilling fluids are either lost to the formation matrix or to voids in direct communication with the wellbore. Lost circulation is undesirable from an economic standpoint because it requires one to continually replenish the wellbore with costly drilling fluid. Lost circulation is also undesirable from an operational and safety standpoint because it can destabilize permeable formations and damage the pay zone, and in extreme cases it can result in a blowout of the hydrocarbon zone followed by a well fire.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

To combat such mud losses into the formation, lost circulation treatments are attempted to plug or block the openings either naturally formed or induced by the drilling operation. Such lost circulation treatments have included a variety of treatment materials, including polymeric based treatments having sufficient strength and integrity to minimize lost circulation into voids in direct communication with the wellbore, such as fractures, fracture networks, vugs, washouts, cavities, and the like.

In addition to troubles associated with mud loss, such polymeric based treatments may also be suitable for strengthening weakly or unconsolidated formation as a preventative measure. It is well known in the petroleum industry that some hydrocarbon-bearing formations are weakly consolidated or, in fact, may be unconsolidated formations. While such formations are known to contain substantial quantities of oil and gas, the production of oil and gas from these formations is difficult because of the movement of particulates such as sand particles and other finely divided particulate solids from the unconsolidated or weakly consolidated formation into the wellbore. This movement is a result of the movement of fluids and may be a result of the differential pressure between the formation and the wellbore created by pumping or by the production of fluids upwardly through the wellbore. Some formations are weakly consolidated or unconsolidated initially and others become weakly consolidated as a result of the production of fluids from the formation, especially when water is present in the produced fluid. Formations of this type are formations which are, at least in part, consolidated by the presence of clays in the formation. Such clays can become dispersed and expanded by the production of aqueous fluids from the formation, thereby weakening the overall formation to the point where it becomes unconsolidated or weakly consolidated with the resulting production of particulates into the wellbore. As a result, uncemented, weakly consolidated or unconsolidated formations impose limits on the draw-down pressure which can be used to produce fluids from the formation. This limits the rate at which fluids can be produced from the subterranean formation. To combat such problems associated with weakly or unconsolidated formations, polymeric gel treatments have been used to consolidate or strengthen the formation.

Similarly, gel treatments may also be used to reduce water production, i.e., water shut-off, through channeling in formation strata of relatively high permeabilities. The treatments may be used to correct channeling or change the injection profile in water flooding. Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

In each of these scenarios, gels, in particular, have found utility in preventing mud loss, stabilizing and strengthening the wellbore, and zone isolation and water shutoff treatments. While there have been an increasing number of developments in gel technology for use downhole, there exists a continuing need for developments in gel technology and means for allowing for greater control and delay in gel curing.

SUMMARY OF INVENTION

In one aspect, embodiments disclosed herein relate to a method of treating a formation that includes injecting gelling components curable by a moisture cure into a selected region of the formation; and controlling the onset of curing of the gelling components by contacting the gelling components with a drying agent.

In another aspect, embodiments disclosed herein relate to a method of treating a formation that includes injecting a wellbore fluid comprising gelling components curable by a moisture cure into a selected region of the formation; contacting the wellbore fluid with a drying agent to capture at least a portion of moisture available in the wellbore fluid to delay onset of curing of the gelling components; and allowing the gelling components to cure.

In yet another aspect, embodiments disclosed herein relate to a method of treating a formation that includes injecting gelling components curable by a moisture cure and a silane drying agent into a selected region of the formation; and capturing at least a portion of available moisture with the silane drying agent.

Other aspects and advantages of the invention will be apparent from the following description and the appended claims.

DETAILED DESCRIPTION

Figure 1:
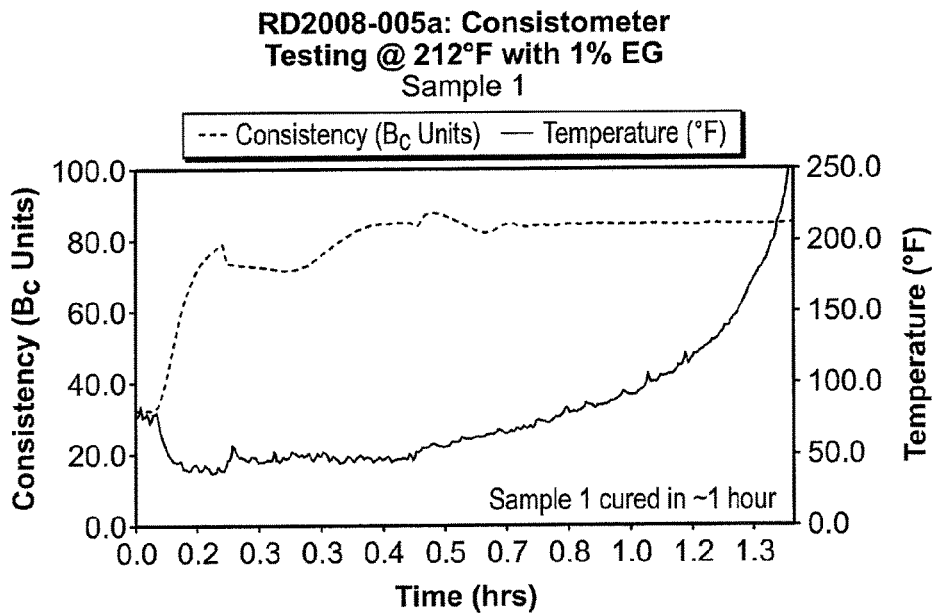
FIG. 1 is a Consistometer reading from one example.
Figure 2:
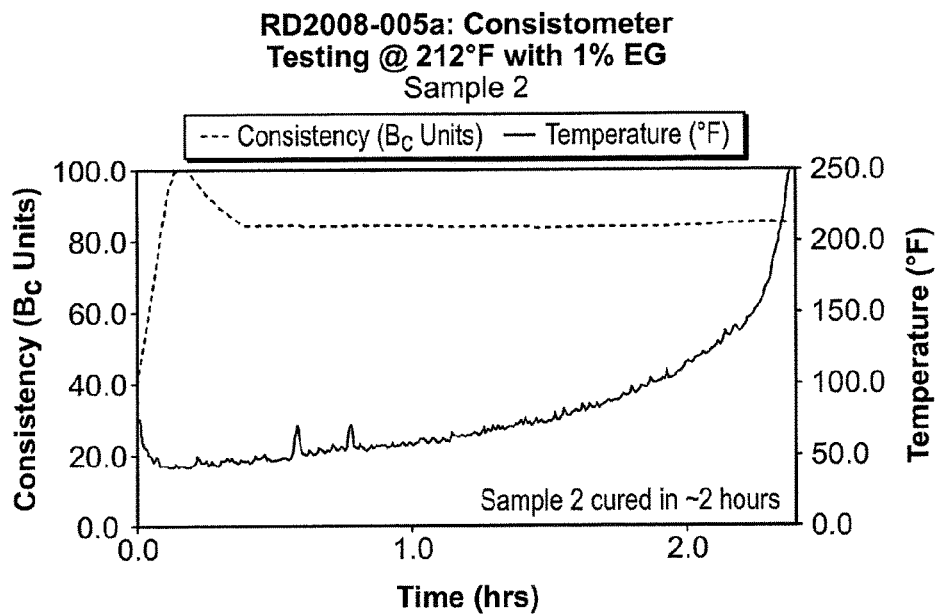
FIG. 2 is a Consistometer reading from one example.
Figure 3:
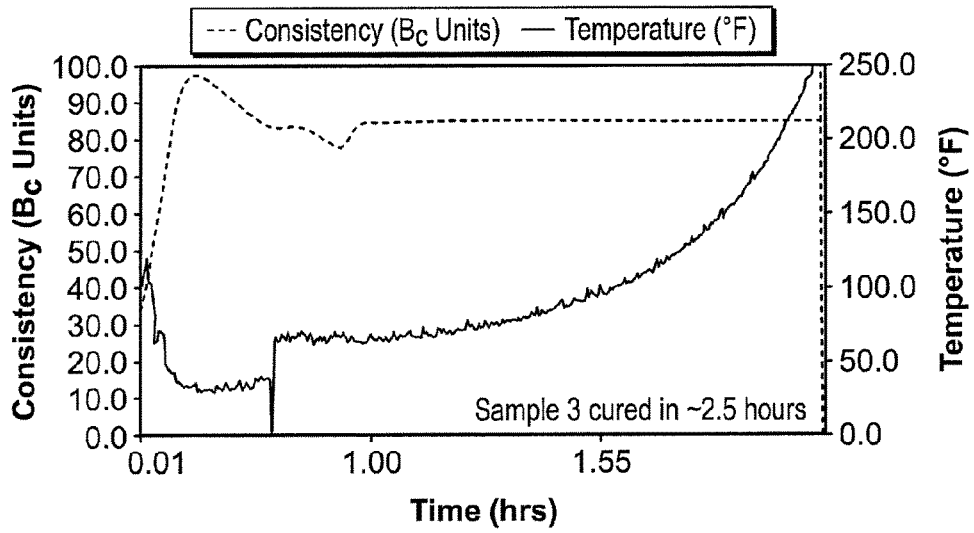
FIG. 3 is a Consistometer reading from one example.
Figure 4:
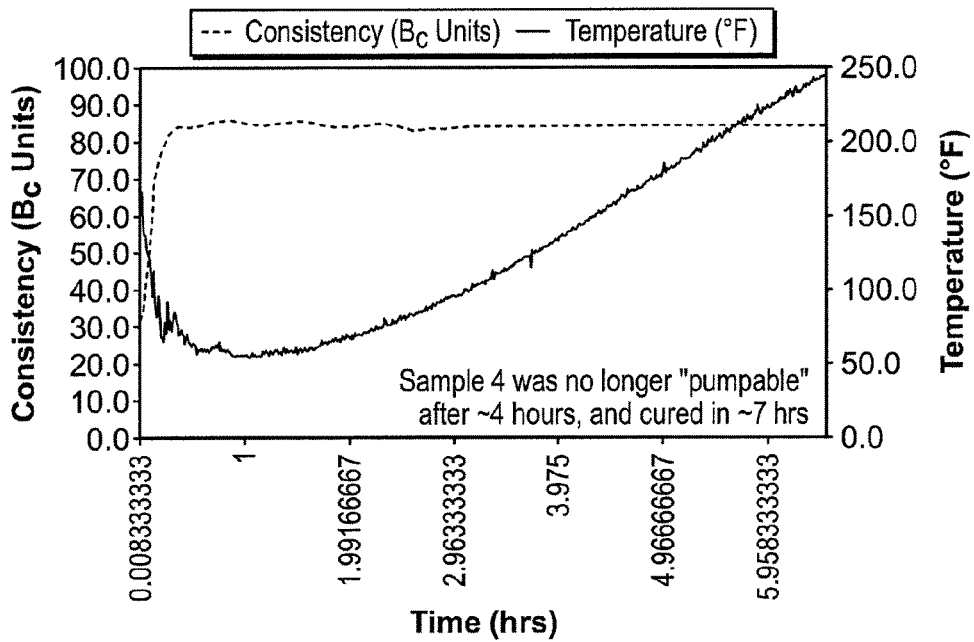
FIG. 4 is a Consistometer reading from one example.
Figure 5:
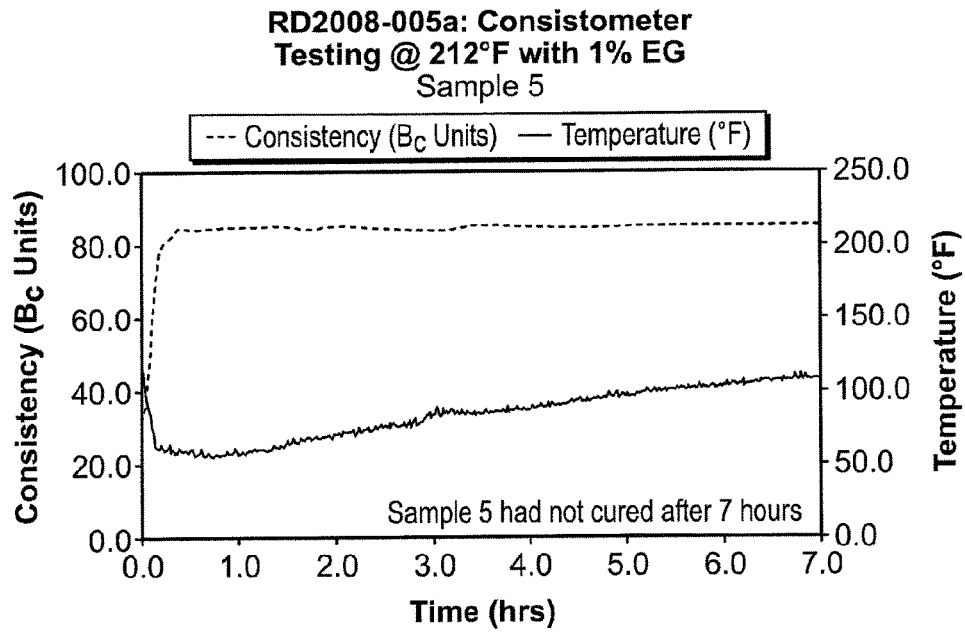
FIG. 5 is a Consistometer reading from one example.
Figure 6:
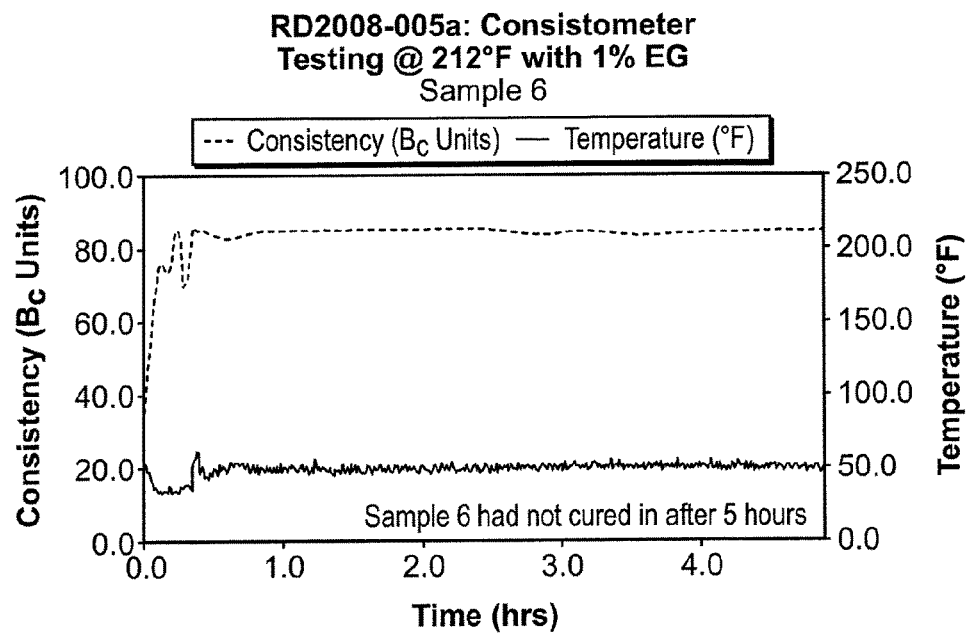
FIG. 6 is a Consistometer reading from one example.
Figure 7:
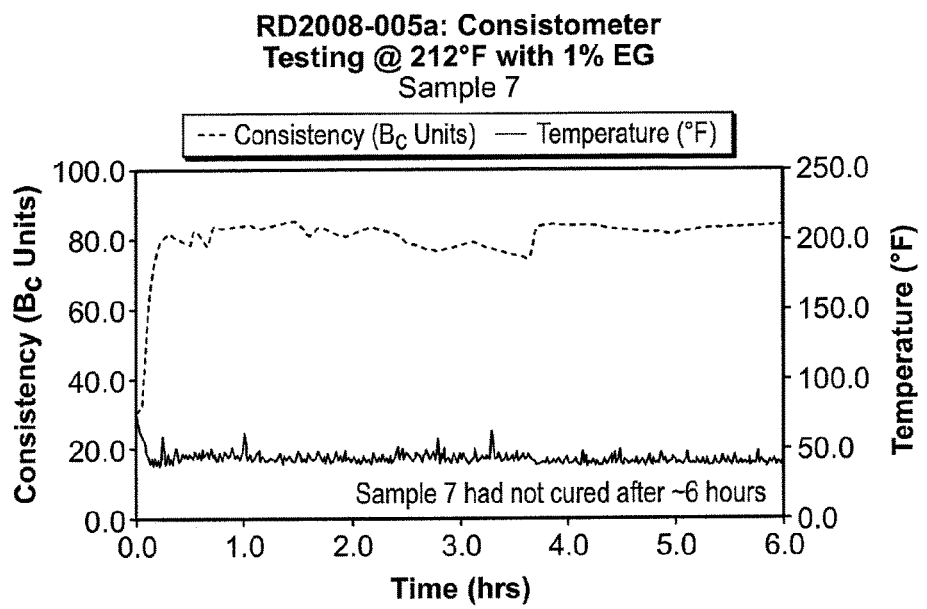
FIG. 7 is a Consistometer reading from one example.
Figure 8:
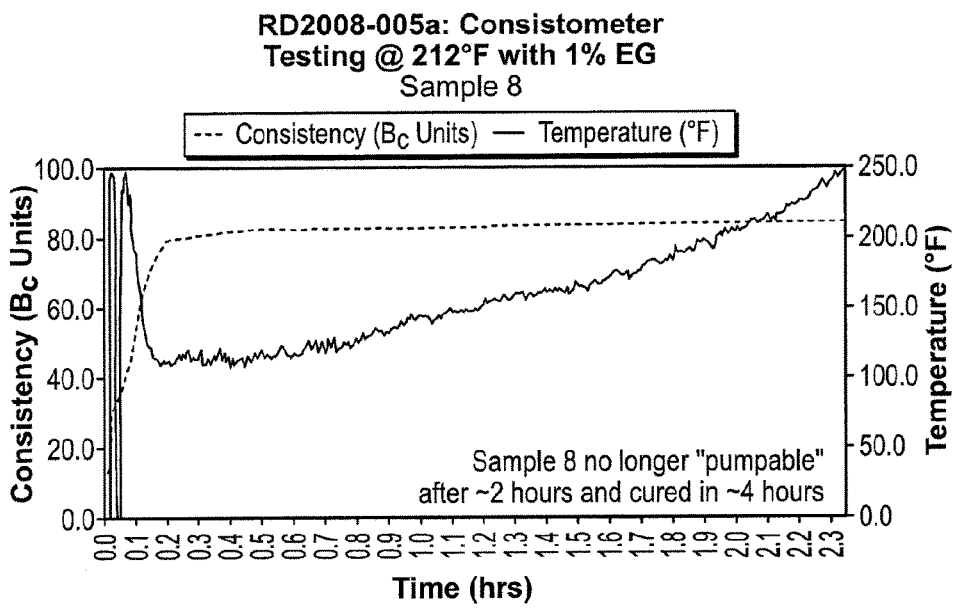
FIG. 8 is a Consistometer reading from one example.

In one aspect, embodiments disclosed herein relate to polymer gel treatments in a wellbore and methods for delaying the onset of curing of such gel treatments downhole. In particular, embodiments disclosed herein relate to delaying/controlling the onset of cure of moisture curable gelling components (i.e., gelling components which cure through hydrolysis). As used herein the term "cure" or "onset of cure" refers to the point at which the viscosity of the gelling components begins to increase beyond the initial viscosity of the gelling components.

Thus, when using moisture curable gelling components, delay of cure may be achieved by removing or capturing a portion of available moisture, which would trigger cure. Removal or capturing of moisture (i.e., water or other hydrolyzing solvents such as ethanol or ethylene glycol) may occur through exposure of a drying agent to the gelling component.

Drying Agent

The term "drying agent" refers to any compound or substance that renders previously available moisture unavailable for reaction/hydrolysis. Such "removal" of water or other forms of moisture may occur through either reaction or absorption of the water. Water may preferentially react with (or be absorbed by) the drying agent such that it is unavailable for hydrolysis of gelling components. Upon exhaustion of the drying agent, the remaining (or newly introduced) moisture may then be available for initiating hydrolysis and cure of the gelling components.

As mentioned above, one mechanism by which the drying agent may capture moisture may be through reaction, i.e., a chemical type of drying agent. Among the types of chemistries which may preferentially react with water or other moisture sources include various silanes. In particular, a silane drying agent that may find particular use in embodiments of the present disclosure may include a compound represented by the following formula:

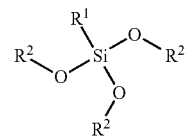

$R^1$ is a $C_1$ to $C_{12}$ hydrocarbon radical; and each $R^2$ is selection from $C_1$ to $C_4$ alkyl groups. As used herein, the term "hydrocarbon radical" is intended to refer to radicals primarily composed of carbon and hydrogen atoms, and thus encompasses aliphatic groups such as alkyl and alkenyl; aromatic groups such as phenyl; and alicyclic groups such as cycloalkyl and cycloalkenyl. Additionally, the term hydrocarbon radical also includes groups that include heteroatoms, and as such, may include functional groups such as ethers, alkoxides, carbonyls, epoxides, esters, amino groups, amido groups, cyano groups, sulfides, sulfates, ureas, isocyanates, carbamates, isocyanurates, sulfides, etc. In particular embodiments, the silane drying agent may include one or more aliphatic trialkoxy silanes, such as the combination of a vinyl trialkoxy silane and an n-alkyl trialkoxysilane. Other chemical drying agents may include organic and inorganic acid anhydride, such as polyphosphoric acid anhydride, halogenated phosphoric compounds, acetic anhydride, phthalic anhydride, polyesters and like.

Reaction schemes for two exemplary silanes are shown below in Eq. 1 and Eq 2. The reaction of an alkyltrimethoxy silane and water is shown in Eq. 1:

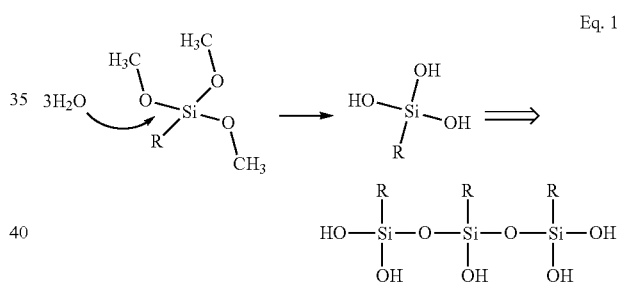

Eq. 1

One skilled in the art would appreciate that depending on the R group, the reaction may vary slightly. For example, if the R group is a vinyl group, water may initially react with the double bond to form a hydroxyethyl prior to triggering the conversion to a silanol.

Moreover, the reaction of an alkyltrimethoxysilane and ethylene glycol is shown in Eq. 2:

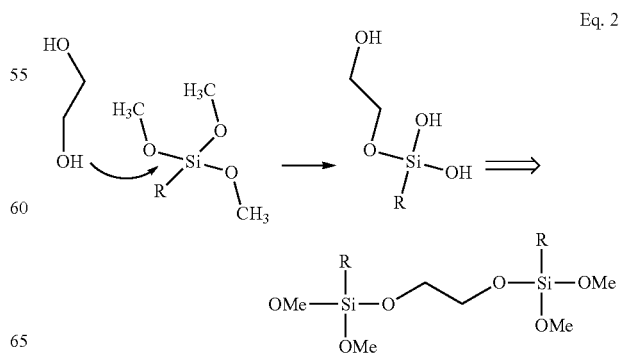

Eq. 2

Use of multiple silane drying agents may allow for greater control and delay of the curing. Selection of the silane groups (and in particular of $R^1$) may also be based on relative reactivity and affinity to water (e.g., a vinyl may be more reactive based on addition of water to its double bond), types of moisture present (e.g., water or ethylene glycol) as well as the mechanical/material properties that the group may ultimately provide to the subsequently formed gel. The amounts of such chemical drying agents may range from about 0.5 to 30 percent by volume of the fluid in which the gelling components are provided. However, one skilled in the art would appreciate that the desired amount may vary depending on the affinity to moisture of the particular drying agent being used, amount of moisture present and/or the amount of delay desired.

In addition to chemically controlling the onset of cure, such delay may alternatively be achieved through physical means, i.e., by absorbing available water or other moisture sources (as desired). For example, in such embodiments, the drying agent may act as a desiccant, and may include in various embodiments, substances such as zeolites (and other molecular sieves), crosslinked polymers, silica (sodium silicate), anhydrous magnesium sulfate, calcium chloride and the likes. In such embodiments, the substance may be selected based on selectivity for water versus other moisture sources that may be present, i.e., the pores in the zeolite may be small enough to receive water molecules yet too large for the slightly larger ethylene glycol. The amounts of such physical drying agents may range from about 1 to 40 percent by volume of the fluid in which the gelling components are provided. However, one skilled in the art would appreciate that the desired amount may vary depending on the amount of moisture present and/or the amount of delay desired.

Gelling Components

As described above, the gelling components whose cure is controlled/delayed using the drying agents disclosed herein cure via a moisture cure. That is, a source of moisture triggers hydrolysis of the components, and as the components begin to react/crosslink, the viscosity of the fluid begins to increase beyond the initial viscosity. It is within the scope of the present disclosure that when used in combination with the silane drying agents, for example, the reaction of the gelling component may be triggered by either excess moisture or by formed silanols (or other hydroxyl groups) present on the drying agent. As known in the art, there exists a variety of moisture-curable gel systems, and no limitation is placed on the types of such moisture-curable gels that may be controlled according to the embodiments disclosed herein. However, two particular types of moisture-curable gel systems include polysiloxanes and silylated prepolymers (such as silylated polyurethanes). Such exemplary gel systems are described below for descriptive purposes only.

Polysiloxanes

Polysiloxanes may be formed from monomers having terminal alkoxy silane (SiOR) groups which are hydrolyzed to terminal silanol groups (SiOH) which may readily react via a condensation reaction with other silanol or alkoxysilanes to produce longer and interconnected chains. Thus, a simplified version of the condensation pathway is shown in Eq. 3 and 4:

Eq. 3

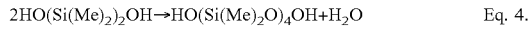
Eq. 4.

Further, repeated hydrolysis and reaction of reactive polymer ends may eventually lead to full cure. Moreover, one skilled in the art would appreciate that by varying the substituents on the silane, a more complicated polymeric network may be formed. Additionally, other crosslinkants or functionalities may be provided depending on the ultimate properties desired. Additionally, while the above simplified conventional pathway shows the reaction between silanol groups, ones skilled in the art would appreciate that when used in combination with some chemical drying agents, such as silanes, silanols present on the drying agent may in turn react with terminal silicon groups on a prepolymer without converting alkoxy groups to silanols, for example. Further, one skilled in the art would also appreciate that the initial gelling components used in the methods of the present disclosure may include monomers or oligomeric prepolymers, i.e., polysilylated and polysiloxane prepolymers.

Silane Terminated Polymers

While the above shows polysiloxanes, one skilled in the art would appreciate that this mechanism would similarly apply to any silane terminated polymers may include low viscosity prepolymers which may undergo a moisture cure, similar to that shown for polysiloxanes. Alkoxy groups on the terminal silanes, which are methoxy groups in the exemplary mechanism shown below, may be readily cleaved by moisture to be replaced with terminal silanol groups. Thus, prepolymers having reactive silanol groups may form larger chains by condensation of the terminal groups. A variety of prepolymers be functionalized with such silane terminal groups to be rendered moisture curable including, for example, polyurethanes, polyureas, polyethers, polyesters, polyamides, polyimides, polyacrylates, polyalkylenes, polyvinyls, polycarbonates, etc, and mixtures thereof.

Methods of Use

Embodiments of the present disclosure may be used in any application in which polymeric gel treatments are used including: in fluid shut off, wellbore (WB) strengthening treatments, zonal isolation, in drilling muds and drill-in fluids, in enhanced oil recovery (EOR), in loss circulation material (LCM) pills, soil stabilization, as a dust suppressant, as a water retainer or a soil conditioner, as hydrotreating (HT) fluid loss additives, and others.

The components disclosed herein may be formed in a one-solution system, where the gelling components are premixed with the drying agent, and the mixture may then be placed or injected prior to cure. Other embodiments of the gels disclosed herein may also be formed in a two-component system, where the gelling components and drying agent may be mixed separately and combined immediately prior to injection. Alternatively, one reagent may be placed in the wellbore or the near-wellbore region where it may then be contacted by the other reagent, as required. Such systems may include formulation in a variety of solvents including various oleaginous fluids as known in the art, moisture sources and other hydrolyzing agents such as ethylene glycol, as necessary for desired cure.

Wellbore stability may be enhanced by the injection of the gelling components into formations along the wellbore. The reaction between the gelling components may be controlled or delayed by the presence of the drying agent. Upon delay to allow for injection/desired placement and exhaustion of the drying agent, the gelling components may then react, strengthening the formation along the wellbore upon gellation of the mixture.

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through only a small percentage of the volume of the reservoir, for example, and may thus require an excessive amount of treatment fluid to displace a high percentage of crude oil from a reservoir.

To combat the thief zones or high permeability zones of a formation, embodiments of the gels disclosed herein may be injected into the formation. Gels injected into the formation may partially or wholly restrict flow through the highly conductive zones. In this manner, the gels may effectively reduce channeling routes through the formation, forcing the treating fluid through less porous zones, and potentially decreasing the quantity of treating fluid required and increasing the oil recovery from the reservoir.

In other embodiments, gels may also be formed in situ within the formation to combat the thief zones. Gelling components may be injected into the formation, allowing the components to penetrate further into the formation than if a gel was injected. By forming the gels in situ in the formation, it may be possible to avert channeling that may have otherwise occurred further into the formation, such as where the treatment fluid traverses back to the thief zone soon after bypassing the injected gels as described above. Further, depending on the amount of drying agent added, and the amount of moisture available in the injected fluid and/or formation, gelling may be delayed until additional quantities of water traverse through the formation and encounter the gelling components. Such may be the situation in water shut off, where cure of the gelling components may be injected as a preventative or remediative treatment, and gelling may be initiated by a flood of water or other moisture sources available.

As mentioned above, gels disclosed herein may be used as one component in a drilling fluid. The gels may form part of a filter cake, minimizing seepage of drilling fluids to underground formations and lining the wellbore. As another example, embodiments of the gels disclosed herein may be used as one component in loss circulation material (LCM) pills that are used when excessive seepage or circulation loss problems are encountered, requiring a higher concentration of loss circulation additives. LCM pills are used to prevent or decrease loss of drilling fluids to porous underground formations encountered while drilling.

Thus, in some embodiments, the gelling components and drying agent may be mixed prior to injection of the pill into the drilled formation. Some quantity of moisture may be present in the original fluid injected, or a separate amount of water may be separately injected so that the excess water may initiate cure of the gel in situ.

EXAMPLES

The following examples were used to test the effectiveness of various drying agents in the ability to delay cure of moisture-curable gelling components. The following components were used in the formulation of the fluids for testing the cure times, which unless otherwise notes are available from M-I LLC (Houston, Tex.): LVT-200, a base oil; TRU-VIS®, an organophilic clay; EMI-1829, a silane end-capped polyurethane prepolymer; EMI-1833, a vinyltrimethoxysilane; EMI-1831, an n-octyltriethoxysilane; EMI-1835, fumed silica; SWA-EH, an oil wetting agent available from Lamberti (Gallarate, Italy); G-SEAL™, an industrial carbon blend; SAFECARB™ 250, a calcium carbonate bridging agent; and SYLOSIV® 3A, a molecular sieve powder available from W.R. Grace & Co. (Baltimore, Md.).

Example 1

The following samples of gelling systems were formulated with varying amounts of silane drying agents. The samples were subjected to a Consistometer test at 212° F., whereby the consistency of the given volume of sample was measured with time. The formulations are shown in Table 1 below, and the Consistometer readings are shown in FIGS. 1-8.

TABLE 1

| | Sample Nos. | | | | | | | |
|---|---|---|---|---|---|---|---|---|
| Components | 1 | 2 | 3 | 4 | 5 | 6 | 7 | 8 |
| Total Volume (mL) | 650 | 650 | 650 | 650 | 650 | 1000 | 650 | 650 |
| LVT-200 (mL) | 208.58 | 208.58 | 208.58 | 208.58 | 208.58 | 320.59 | 208.58 | 208.58 |
| TRUVIS ® | 12.60 | 12.60 | 12.60 | 12.60 | 12.60 | 19.38 | 12.60 | 12.60 |
| EMI-1829 (mL) | 188.66 | 188.66 | 188.66 | 188.66 | 188.66 | 290.25 | 188.66 | 188.66 |
| EMI-1833 (mL) (%) | — | 2.99 | 8.97 | 11.96 | 14.95 | 27.60 | 59.79 | 12.51 |
| | 0 | 0.64 | 1.93 | 2.58 | 3.22 | 3.86 | 12.88 | 3.0 |
| EMI-1831 (mL) (%) | 59.79 | 56.81 | 50.83 | 47.84 | 44.85 | 64.39 | — | — |
| | 12.88 | 12.24 | 10.95 | 10.30 | 9.66 | 9.02 | 0 | 0 |
| EMI-1835(g) | 6.37 | 6.37 | 6.37 | 6.37 | 6.37 | 9.80 | 6.37 | 6.37 |
| MEG (mL) (%) | 4.82 | 4.82 | 4.82 | 4.82 | 4.82 | 7.41 | 4.82 | 4.82 |
| | 1.0 | 1.0 | 1.0 | 1.0 | 1.0 | 1.0 | 1.0 | 1.0 |
| H₂O (mL) (%) | — | — | — | — | — | — | — | — |
| SWA-EH (mL) | 2.41 | 2.41 | 2.41 | 2.41 | 2.41 | 3.70 | 2.41 | 2.41 |
| Barite (g) | 483.45 | 483.45 | 483.45 | 483.45 | 483.45 | 743.77 | 483.45 | 483.45 |
| SAFECARB250 (g) | 65.83 | 65.83 | 65.83 | 65.83 | 65.83 | 99.75 | 65.83 | 65.83 |
| G-SEAL (g) | 64.85 | 64.85 | 64.85 | 64.85 | 64.85 | 99.77 | 64.85 | 64.85 |

Figure 9:
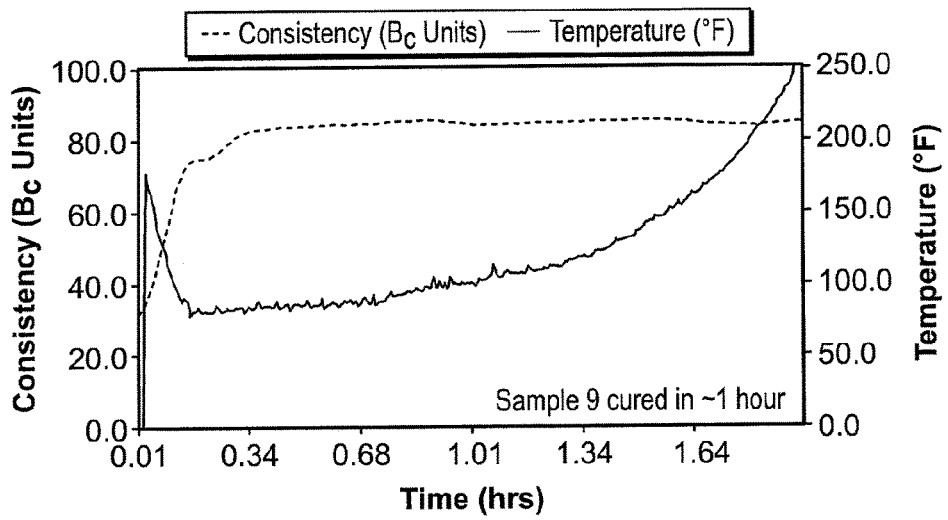
FIG. 9 is a Consistometer reading from one example.
Figure 10:
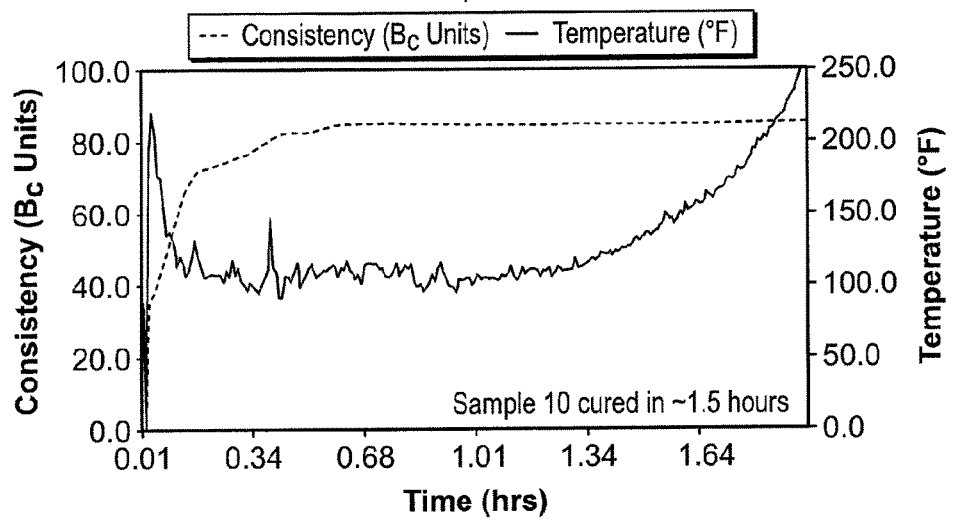
FIG. 10 is a Consistometer reading from one example.
Figure 11:
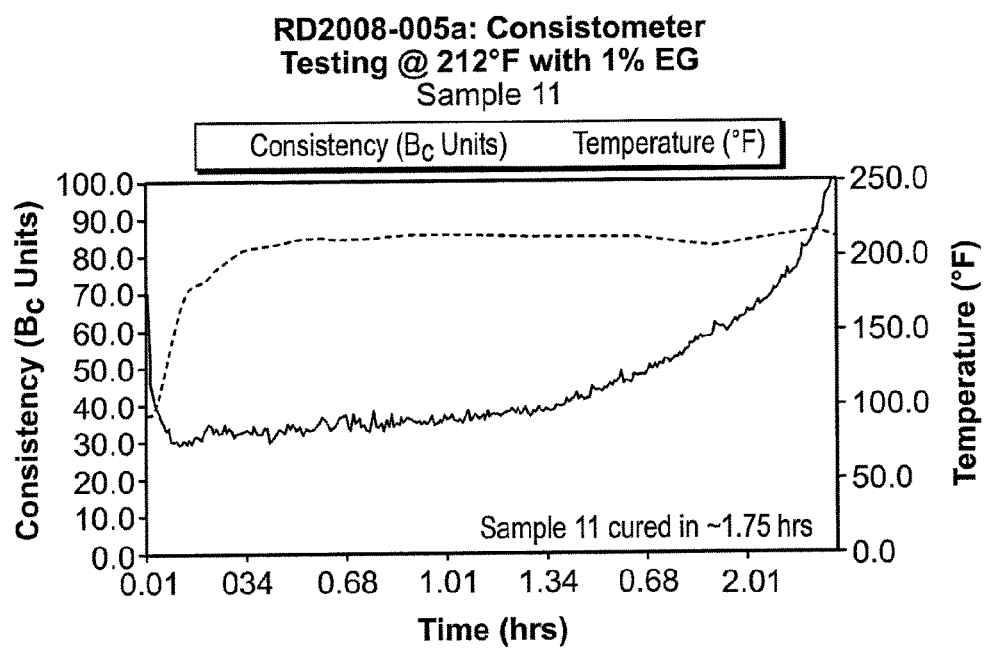
FIG. 11 is a Consistometer reading from one example.

The following samples of EMS-8320 gelling systems were formulated with varying amounts of zeolite drying agents. The samples were subjected to a Consistometer test at 212° F., whereby the consistency of the given volume of sample was measured with time. The formulations are shown in Table 2 below, and the Consistometer readings are shown in FIGS. 9-11.

TABLE 2

| | Sample Nos. | | |
|---|---|---|---|
| Components | 9 | 10 | 11 |
| Total Volume (mL) | 650 | 650 | 650 |
| LVT-200 (mL) | 208.58 | 208.58 | 208.58 |
| TRUVIS ® | 12.60 | 12.60 | 12.60 |
| EMI-1829 (mL) | 188.66 | 188.66 | 188.66 |
| EMI-1831 (mL) | 59.79 | 59.79 | 59.79 |
| | 12.88 | 12.88 | 12.88 |
| EMI-1835(g) | 6.37 | 6.37 | 6.37 |
| MEG (mL) | 4.82 | 4.82 | 4.82 |
| | 1.0 | 1.0 | 1.0 |

TABLE 2-continued

|  | Sample Nos. | | |
| --- | --- | --- | --- |
| Components | 9 | 10 | 11 |
| H$_2$O (mL) (%) | 4.82 | 4.82 | — |
|  | 1.0 | 1.0 | 0 |
| SWA-EH (mL) | 2.41 | 2.41 | 2.41 |
| Barite (g) | 483.45 | 483.45 | 483.45 |
| SAFECARB ™ (g) | 65.83 | 65.83 | 65.83 |
| G-SEAL ™ (g) | 64.85 | 64.85 | 64.85 |
| SYLOSIV ® 3A (g) | — | 24.18 | 24.18 |
| (%) | 0 | 20% | 20% |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating a formation, comprising:
   injecting gelling components into a selected region of the formation, wherein the gelling components are provided in an oleaginous base fluid, wherein the gelling components comprise silane terminated prepolymers; and
   delaying the onset of curing of the gelling components with a moisture cure by contacting the gelling components with a drying agent, the drying agent chemically reacting with moisture;
   wherein the silane terminated prepolymers are selected from the group of polyurethanes, polyureas, polyesters, polyamides, polyimides, polyalkylenes, polyvinyls, polycarbonates and mixtures thereof.

2. The method of claim 1, wherein the drying agent comprises at least one silane represented by the following formula:

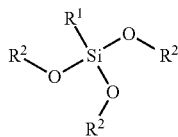

R$^1$ is a C$_1$ to C$_{12}$ hydrocarbon radical; and each R$^2$ is selected from C$_1$ to C$_4$ alkyl groups.

3. The method of claim 2, wherein the drying agent comprises a vinyltrialkoxysilane and an alkyltrialkoxysilane.

4. The method of claim 1, further comprising:
   injecting water or ethanol or ethylene glycol to initiate cure of the gelling components.

5. The method of claim 1, wherein the moisture cure is moisture cure present in the formation.

6. The method of claim 1, wherein the moisture cure is an excess of water present with the gelling components.

7. A method of treating a formation, comprising:
   injecting a wellbore fluid comprising gelling components into a selected region of the formation, wherein the gelling components comprise silane terminated prepolymers, wherein the silane terminated prepolymers are selected from the group of polyurethanes, polyureas, polyesters, polyamides, polyimides, polyalkylenes, polyvinyls, polycarbonates and mixtures thereof;
   contacting the wellbore fluid with a drying agent to capture at least a portion of moisture available in the wellbore fluid by chemical reaction to delay onset of curing of the gelling components with a moisture cure;
   injecting a moisture source into the formation separate from the injection of the gelling components and the drying agent to initiate cure of the gelling components; and
   allowing the gelling components to cure.

8. The method of claim 7, wherein the drying agent comprises at least one silane represented by the following formula:

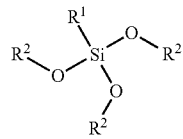

R$^1$ is a C$_1$ to C$_{12}$ hydrocarbon radical; and each R$^2$ is selected from C$_1$ to C$_4$ alkyl groups.

9. The method of claim 8, wherein the drying agent comprises a vinyltrialkoxy silane and an alkyltrialkoxysilane.

10. The method of claim 7, wherein moisture present in the formation initiates cure of the gelling components.

11. The method of claim 7, wherein excess moisture present in the wellbore fluid initiates cure of the gelling components.

12. A method of treating a formation, comprising:
    injecting gelling components curable by a moisture cure and a silane drying agent into a selected region of the formation, wherein the gelling components are provided in an oleaginous base fluid, wherein the gelling components comprise silane terminated prepolymers selected from the group of polyurethanes, polyureas, polyesters, polyamides, polyimides, polyalkylenes, polyvinyls, polycarbonates and mixtures thereof; and
    capturing at least a portion of available moisture with the silane drying agent.

13. The method of claim 12, wherein the silane drying agent comprises at least one silane represented by the following formula:

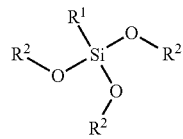

R$^1$ is a C$_1$ to C$_{12}$ hydrocarbon radical; and each R$^2$ is selected from C$_1$ to C$_4$ alkyl groups.

14. The method of claim 13, wherein the drying agent comprises a vinyltrialkoxysilane and an alkyltrialkoxysilane.

15. The method of claim 12, further comprising:
    injecting water or ethanol or ethylene glycol to initiate cure of the gelling components.

16. The method of claim 12, wherein moisture present in the formation initiates cure of the gelling component.

17. The method of claim 12, wherein excess moisture present with the gelling components initiates cure of the gelling components.

* * * * *